United States Patent
Baldoni et al.

(10) Patent No.: US 9,605,726 B2
(45) Date of Patent: Mar. 28, 2017

(54) SECONDARY DAMPENING ASSEMBLY FOR SHOCK ABSORBER

(71) Applicant: Tenneco Automotive Operating Company Inc., Lake Forest, IL (US)

(72) Inventors: Frederik Baldoni, Borgloon (BE); Etienne Leruth, Velm (BE)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 0 days.

(21) Appl. No.: 15/014,625

(22) Filed: Feb. 3, 2016

(65) Prior Publication Data

US 2016/0223045 A1 Aug. 4, 2016

Related U.S. Application Data

(60) Provisional application No. 62/111,269, filed on Feb. 3, 2015.

(51) Int. Cl.
*F16F 9/512* (2006.01)
*F16F 9/48* (2006.01)
(Continued)

(52) U.S. Cl.
CPC .......... *F16F 9/48* (2013.01); *B60G 13/08* (2013.01); *B60G 15/062* (2013.01); *F16F 9/165* (2013.01);
(Continued)

(58) Field of Classification Search
CPC ........ F16F 9/44; F16F 9/48; F16F 9/52; F16F 9/346; F16F 9/512; F16F 9/5126
(Continued)

(56) References Cited

U.S. PATENT DOCUMENTS 2,519,605 A * 8/1950 Rossman ............... F16F 9/185
188/315
2,537,423 A * 1/1951 Rossman ............... F16F 9/48
188/315
(Continued)

FOREIGN PATENT DOCUMENTS

CN 101456111 A 6/2009
CN 202023876 U 11/2011
(Continued)

OTHER PUBLICATIONS

International Search Report for Application No. PCT/US2016/016296 dated Apr. 25, 2016, 4 pages.
(Continued)

*Primary Examiner* — Christopher Schwartz
(74) *Attorney, Agent, or Firm* — Howard & Howard Attorneys PLLC

(57) ABSTRACT

A shock absorber is disclosed having a secondary dampening assembly for dampening movement of an inner assembly within the shock absorber. The secondary dampening assembly includes a hydraulic stop piston and a hydraulic stop sleeve. The hydraulic stop piston is carried by an extender with a gap defined radially between the hydraulic stop piston and the extender to allow radial movement. The hydraulic stop sleeve has an open end for receiving the hydraulic stop piston and a flow groove that extends longitudinally along an inner surface of the hydraulic stop sleeve.

20 Claims, 15 Drawing Sheets

(51) Int. Cl.
*F16F 9/16* (2006.01)
*B60G 13/08* (2006.01)
*B60G 15/06* (2006.01)

(52) U.S. Cl.
CPC .... *B60G 2200/142* (2013.01); *B60G 2202/24* (2013.01); *B60G 2202/312* (2013.01)

(58) Field of Classification Search
USPC ........... 188/284–287, 313, 315, 318, 322.15, 188/322.22
See application file for complete search history.

(56) References Cited

U.S. PATENT DOCUMENTS

| | | | |
|---|---|---|---|
| 2,742,112 A | 4/1956 | Wessel | |
| 2,783,859 A | 3/1957 | Patriquin | |
| 2,907,414 A | 10/1959 | Patriquin | |
| 2,984,321 A | 5/1961 | Schultze | |
| 3,175,645 A | 3/1965 | Schäfer et al. | |
| 3,344,894 A * | 10/1967 | Kenworthy | F16F 9/44 |
| | | | 137/625.3 |
| 3,447,644 A | 6/1969 | Duckett | |
| 3,750,856 A * | 8/1973 | Kenworthy | F16F 9/512 |
| | | | 188/287 |
| 4,010,829 A | 3/1977 | Naito et al. | |
| 4,026,533 A * | 5/1977 | Hennells | F16F 9/48 |
| | | | 188/287 |
| 4,045,008 A | 8/1977 | Bauer | |
| 4,166,522 A * | 9/1979 | Bourcier de Carbon | F16F 9/346 |
| | | | 188/287 |
| 4,337,849 A * | 7/1982 | Siorek | F16F 9/52 |
| | | | 184/6.22 |
| 4,971,181 A | 11/1990 | Zaenglein et al. | |
| 5,647,580 A | 7/1997 | Buma | |
| 5,996,978 A * | 12/1999 | Asanuma | B60G 17/0408 |
| | | | 188/315 |
| 6,290,035 B1 | 9/2001 | Kazmirski et al. | |
| 6,352,145 B1 | 3/2002 | DeMolina et al. | |
| 6,446,771 B1 | 9/2002 | Sintorn et al. | |
| 7,216,861 B1 | 5/2007 | LaBarbera | |
| 7,320,388 B2 * | 1/2008 | de Molina | F16F 9/34 |
| | | | 188/281 |
| 7,431,135 B2 * | 10/2008 | Vanbrabant | F16F 9/3221 |
| | | | 188/282.1 |
| 7,441,640 B2 | 10/2008 | Russell | |
| 8,074,974 B2 | 12/2011 | Nogami et al. | |
| 8,511,447 B2 | 8/2013 | Nowaczyk et al. | |
| 8,550,223 B2 | 10/2013 | Cox et al. | |
| 8,590,678 B2 | 11/2013 | Bombrys et al. | |
| 8,701,846 B2 | 4/2014 | Reybrouck et al. | |
| 8,714,320 B2 | 5/2014 | Bombrys et al. | |
| 8,807,302 B2 | 8/2014 | Nygren et al. | |
| 9,133,902 B2 * | 9/2015 | Spyche, Jr. | F16F 9/346 |
| 2004/0026836 A1 | 2/2004 | Brookes | |
| 2007/0000743 A1 | 1/2007 | Naitou et al. | |
| 2009/0101459 A1 | 4/2009 | Sawai | |
| 2009/0277734 A1 | 11/2009 | Cox et al. | |
| 2012/0061194 A1 | 3/2012 | Yu | |
| 2014/0008161 A1 | 1/2014 | Cox | |
| 2015/0330475 A1 | 11/2015 | Slusarczyk et al. | |
| 2016/0230835 A1 | 8/2016 | Groves et al. | |

FOREIGN PATENT DOCUMENTS

| | | |
|---|---|---|
| DE | 19829765 A1 | 2/1999 |
| EP | 1717478 A1 | 11/2006 |
| JP | S626403 A | 3/1987 |
| JP | H07233842 A | 9/1995 |
| WO | WO2014048993 A1 | 4/2014 |
| WO | WO 2016126776 A1 | 8/2016 |
| WO | WO 2016127076 A1 | 8/2016 |

OTHER PUBLICATIONS

International Search Report for Application No. PCT/US2016/016812 dated Apr. 25, 2016, 4 pages.
English language abstract and machine-assisted English translation of CN 202023876 extracted from espacenet.com database on Sep. 9, 2016, 15 pages.
English language abstract and machine-assisted English translation of CN 101456111 extracted from espacenet.com database on Sep. 9, 2016, 19 pages.
English language abstract for JPS6264603 extracted from espacenet.com database on Aug. 4, 2016, 2 pages.
English language abstract and machine-assisted English translation for JPH07233842 extracted from espacenet.com database on Aug. 8, 2016, 8 pages.
English language abstract and machine-assisted English translation for DE19829765 extracted from espacenet.com database on Aug. 8, 2016, 10 pages.
English language abstract and machine-assisted English translation for EP1717478 extracted from espacenet.com database on Aug. 8, 2016, 11 pages.

* cited by examiner

SECONDARY DAMPENING ASSEMBLY FOR SHOCK ABSORBER

CROSS-REFERENCE TO RELATED APPLICATIONS

The subject patent application claims priority to and all the benefits of U.S. Provisional Patent Application No. 62/111,269, filed on Feb. 3, 2015, which is herein incorporated by reference in its entirety.

BACKGROUND OF THE INVENTION

1. Field of the Invention

The present disclosure relates generally to shock absorbers having secondary dampening assemblies. Specifically, the present disclosure describes secondary dampening assemblies, such as lockout pistons and lockout collars, hydraulic stop pistons and hydraulic stop sleeves, flow discs and orifice plugs, and dual-spring stops.

2. Description of the Related Art

Conventional shock absorbers known in the related art typically include an outer tube, a piston assembly, a rod, fluid, and one or more valves, whereby the piston assembly is connected to the rod and travels within fluid in the outer tube in operation so as to dampen axial movement of the rod with respect to the outer tube. To that end, respective opposing ends of the rod and outer tube are attached to different members or structures so as to dampen movement therebetween. By way of example, conventional automotive suspension systems utilize shock absorbers in connection with springs external to the shock absorber to control the suspension dampening in compression and rebound, whereby the shock absorber is typically attached to a knuckle supporting a wheel at one end, and to a portion of the vehicle's frame or body at the other end.

Depending on the application, the shock absorber may also include an inner tube disposed inside the outer tube, wherein the piston assembly is instead supported in the inner tube. The shock absorber is sealed at an end that receives the piston assembly. The inner tube defines a working chamber filled with fluid through which the piston assembly can move in operation. The piston assembly generally divides the working chamber into an upper working chamber and a lower working chamber. Similarly, a reservoir chamber is defined in the space between the outer tube and the inner tube. The reservoir chamber also contains fluid and is in regulated fluid communication with the working chamber via one or more valves. The chambers are sealed to prevent the leakage of fluid therefrom. The outer tube is typically manufactured from steel and, consequently, can be heavy. Since the outer tube is manufactured from steel, the end of the outer tube is sealed by known methods, such as crimping or roll forming. The outer tube typically engages a rod guide assembly to seal the chambers.

During normal shock absorber operation, the shock absorber is extended and compressed during vehicle wheel and body articulation. If the shock absorber is completely compressed during wheel or body articulation, a condition referred to as "bottoming out" occurs and causes an abrupt metal-to-metal noise. Further, the condition causes harsh feedback and/or vibrations that are felt by the driver.

BRIEF SUMMARY OF THE INVENTION

A shock absorber having a secondary dampening assembly is disclosed for absorbing and dissipating forces encountered when the shock absorber is operated. The secondary dampening assembly includes a hydraulic stop piston and a hydraulic stop sleeve. The hydraulic stop piston is carried by an extender with a gap defined radially between the hydraulic stop piston and the extender to allow radial movement. The hydraulic stop sleeve has an open end for receiving the hydraulic stop piston and a flow groove that extends longitudinally along an inner surface of the hydraulic stop sleeve.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
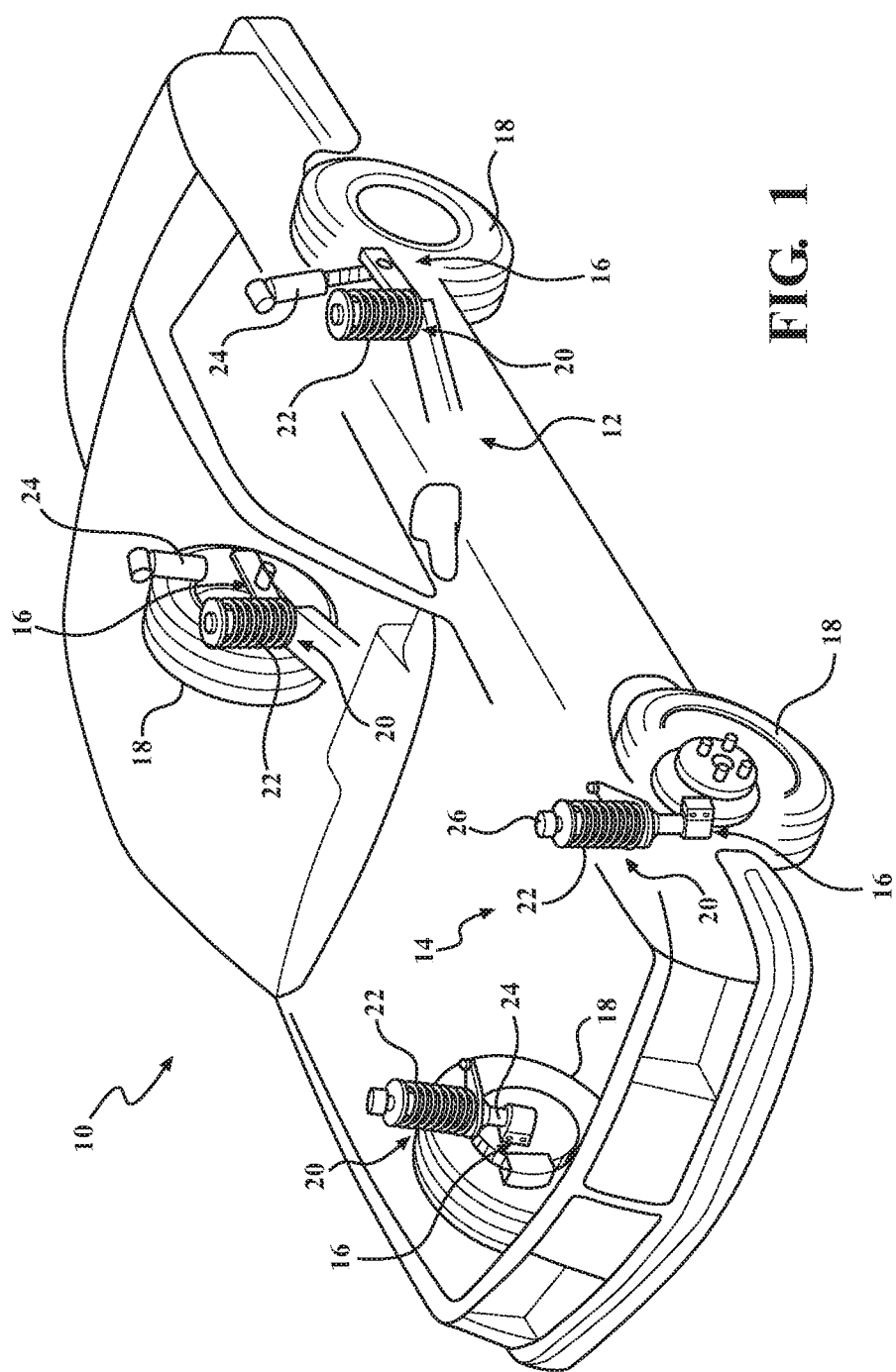
FIG. 1 is an enlarged perspective view of a generic vehicle showing a conventional suspension system.

With reference to the Figures, where like numerals are used to designate like structures throughout the several views, a portion of a conventional vehicle is illustrated at 10 in FIG. 1. The vehicle 10 includes a body 12 operatively attached to a suspension system 14 defined by four corner assemblies 16. The corner assemblies 16 are each assigned to a rotatably supported wheel 18 and are used to control the relative motion between the vehicle body 12 and wheel 18. The corner assemblies 16 each typically include strut assemblies 20 that include a spring 22 to help absorb impacts and a shock absorber 24 to help control motion of the spring 22 by dampening movement between the wheel 18 and vehicle body 12.

As shown in FIG. 1, the springs 22 are compression springs and can be either concentrically aligned around the shock absorber 24, or spaced from the shock absorber 24. Thus, those having ordinary skill in the art will appreciate that the shock absorber 24 of the present invention can be used in connection with any suitable type of spring 22 without departing from the scope of the present invention. Moreover, given the number of different suspension systems 14 known in the related art, it will be appreciated that any suitable number of shock absorbers 24 could be used with any suitable number of springs 22. Further, the shock absorber 24 of the present invention is not limited for use in automotive applications, and could be used in any suitable application without departing from the scope of the present invention.

Figure 2:
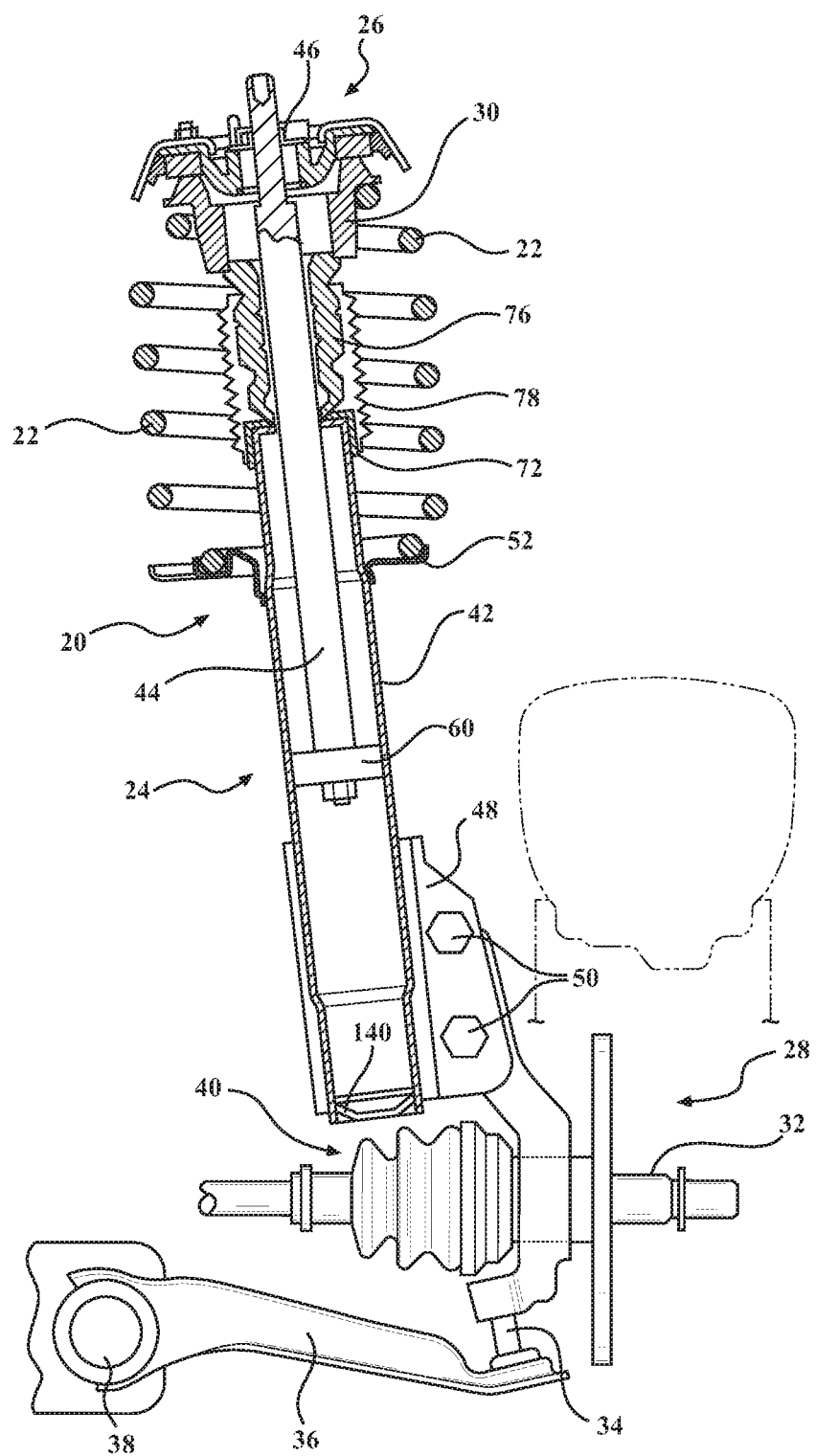
FIG. 2 is a partial sectional side view of a corner assembly of the suspension system of FIG. 1 having a conventional shock absorber.

Referring now to FIG. 2, a partial sectional view of the conventional corner assembly 16 is shown for exemplary purposes. Those having ordinary skill in the art will recognize the strut assembly 20 depicted in FIG. 2 as a MacPherson strut system, which includes the shock absorber 24 used to control movement between the vehicle body 12 and wheel 18 (not shown in FIG. 2). The shock absorber 24 is typically mounted between a top mount assembly, generally indicated at 26, and a knuckle 28. The top mount assembly 26 mounts to the body 12 of the vehicle 10 and helps support the spring 22. An upper spring seat 30 is adjacent the top mount assembly 26 and a lower spring seat 52 receives the spring 22.

The knuckle 28 typically includes a rotatably supported hub and bearing assembly 32, to which the wheel 18 is operatively attached. The knuckle 28 is also typically connected to a ball joint 34 mounted to a lower control arm 36 which, in turn, is pivotally supported by a frame member 38 of the vehicle 10. A continuously-variable joint member 40 translates rotational torque from the vehicle transmission (not shown, but generally known in the art) to the wheel 18 via the hub and bearing assembly 32. Thus, the wheel 18 can rotate in operation to drive the vehicle 10, and the suspension system 14 described above absorbs impacts and allows the wheel 18 to move with respect to the body 12.

The shock absorber 24 shown in FIG. 2 is a standard single-walled shock absorber and generally includes a base assembly 42 and a rod 44 concentrically-aligned with and supported within the base assembly 42 as described in greater detail below. The rod 44 typically includes a stepped and/or threaded upper end 46 adapted to secure the shock absorber 24 to the top mount assembly 26. However, it will be appreciated that the shock absorber 24 could be operatively attached to the top mount assembly 26, or to any suitable portion of the vehicle 10, or to any suitable member irrespective of the application, in any suitable way, without departing from the scope of the present invention.

The base assembly 42 has a mounting portion 48 adapted to attach the shock absorber 24 to the knuckle 28. While the base assembly 42 depicted in FIG. 2 is attached to the knuckle 28 with two bolts 50, those having ordinary skill in the art will appreciate that the base assembly 42 of the shock absorber 24 could be operatively attached to any suitable portion of the vehicle 10, or to any suitable member, in any suitable way, without departing from the scope of the present invention.

As will be appreciated from the discussion that follows, common reference will be made to the various components of the shock absorbers 24 shown throughout the Figures for the purposes of clarity and consistency.

Figure 3:
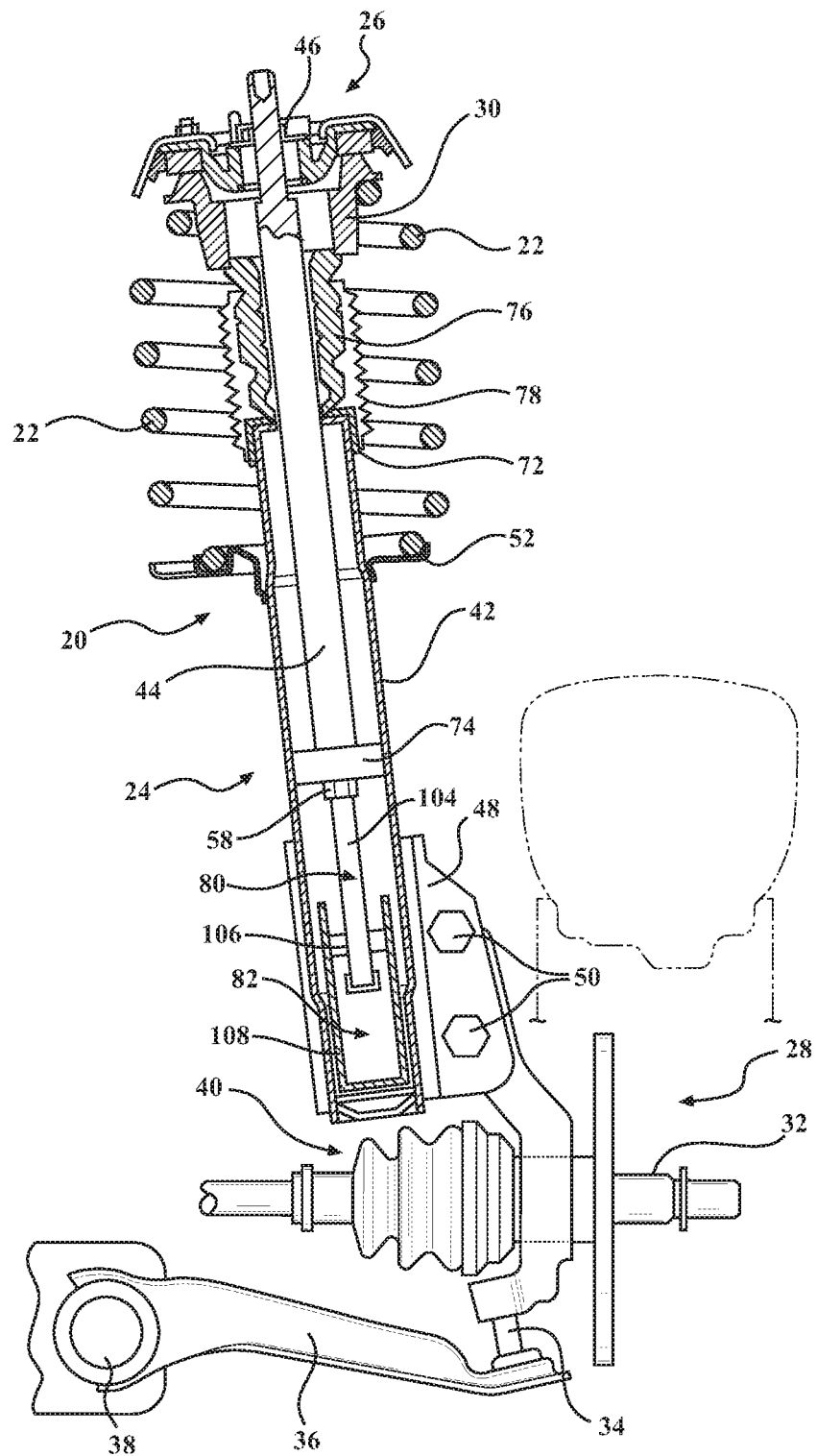
FIG. 3 is a partial sectional side view of a corner assembly of the suspension system of FIG. 1 having a shock absorber having a secondary dampening assembly.

Referring to FIG. 3, FIG. 3 is a partial, cross-sectional view of the shock absorber 24 according to one embodiment of the subject invention which has a secondary dampening assembly shown generally at 80. The secondary dampening assembly 80 disposed within the base assembly 42 includes an extender 104 coupled to a second end 58 of the rod 44, a hydraulic stop piston 106 is carried by the extender 104, and a hydraulic stop sleeve 108. The hydraulic stop sleeve 108 has an open end 111 for receiving the hydraulic stop piston 106 and a closed end 112 and defines a non-tapered bore 82 shaped to receive the hydraulic stop piston 106. The hydraulic stop piston 106 has a diameter less than a diameter of the pressure tube 56. In this manner, as the rod 44 is moved up and down, the hydraulic stop piston 106 does not slide along the extender 104.

Figure 4:
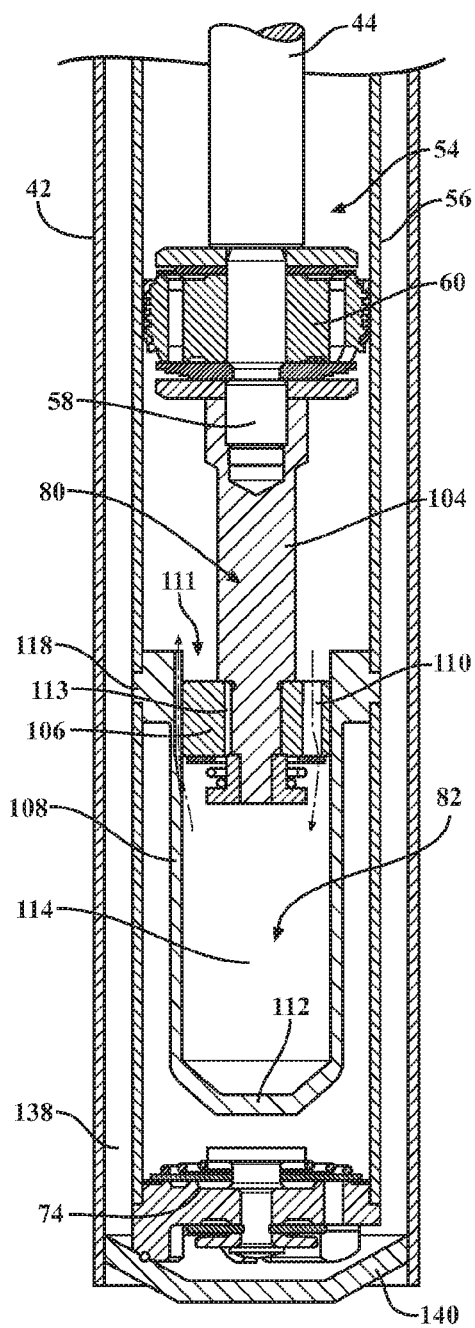
FIG. 4 is a partial, cross-sectional view of a shock absorber having a secondary dampening assembly according to one embodiment of the subject invention.

Referring to FIG. 4, a partial, cross-sectional view of the shock absorber 24 according to one embodiment of the subject invention and having the secondary dampening assembly 80 is shown. The shock absorber 24 includes an inner pressure assembly 54 and the base assembly 42. The inner pressure assembly 54 and base assembly 42 cooperate, as described in greater detail below, to define a "double tube" shock absorber 24. The base assembly 42 may be further described as an outer cylinder, wherein the base assembly 42 defines a chamber 138 for at least partially accommodating the inner pressure assembly 54 therein and the chamber 138 terminates at a floor 140. The inner pressure assembly 54 includes a pressure tube 56, a rod guide 72 (shown in FIG. 3), a compression valve assembly 74, a piston assembly 60, and the rod 44 discussed above.

Still referring to FIG. 4, a partial, cross-sectional view of the shock absorber 24 according to one embodiment of the subject invention and having the secondary dampening assembly 80 is shown. The pressure tube 56 extends between an upper end and a lower end and the rod guide 72 is disposed adjacent the upper end of the pressure tube 56. The compression valve assembly 74 is disposed adjacent to the lower end of the pressure tube 56. The piston assembly 60 is disposed in the pressure tube between the rod guide 72 and the secondary dampening assembly 80. The rod 44 is operatively attached to the piston assembly 60 and has the first, upper end 46 supported by the rod guide 72 so as to concentrically align the rod 44 with the pressure tube 56 and the second, lower end 58 disposed within the pressure tube 56. It is to be appreciated that various piston assemblies 60 and compression valve assemblies 74 may be used with the subject invention without departing therefrom. Examples of such piston assemblies 60 and compression valve assemblies 74 are disclosed in U.S. Pat. Nos. 8,590,678 or 8,714,320, both assigned to Tenneco Automotive Operating Company Inc., which are incorporated herein by reference.

In the embodiment of FIG. 4, the extender 104 is coupled to the second end 58 of the rod 44, the hydraulic stop piston 106 is carried by the extender 104, and the hydraulic stop sleeve 108 is disposed within the pressure tube 56. The extender 104 is shaped to receive and secure the hydraulic stop piston 106 relative to the extender 104. The hydraulic stop piston 106 has a diameter less than a diameter of the pressure tube 56.

The hydraulic stop piston 106 of FIG. 4 is carried by the extender 104, and a gap 113 is defined radially between the hydraulic stop piston 106 and the extender 104 to allow radial movement. The gap 113 is typically a fraction of a mm thick. For example, in many working embodiments, the gap 113 has a thickness of from about 0.5 to about 0.01, alternatively from about 0.4 to about 0.05, mm. The hydraulic stop piston 106 can move radially which allows for smooth entry of the hydraulic stop piston 106 into the hydraulic stop sleeve 108 upon compression and a smooth exit of the hydraulic stop piston 106 out of the hydraulic stop sleeve 108 upon rebound. Further, when the hydraulic stop piston 106 is moving in the hydraulic stop sleeve 108 (during compression and during rebound), the extender 104 can move radially which facilitates smooth movement of the hydraulic stop piston 106 and operation of the secondary dampening assembly 80. In other words, the gap 113 allows for radial/latitudinal movement of the hydraulic stop piston 106 which, in-turn, allows for smooth entry of the hydraulic stop piston 106 into the hydraulic stop sleeve 108 upon compression, as well as smooth movement of the hydraulic stop piston 106 in the hydraulic stop sleeve 108, and a smooth exit of the hydraulic stop piston 106 out of the hydraulic stop sleeve 108 upon rebound.

Still referring to FIG. 4, the hydraulic stop sleeve 108 is disposed within the pressure tube 56 such that the hydraulic stop sleeve engages the pressure tube 56. The hydraulic stop sleeve 108 has open end 111 for receiving the hydraulic stop piston 106 and defines a non-tapered bore 82 shaped to receive the hydraulic stop piston 106. The hydraulic stop sleeve 108 has a closed end 112. A flange 118 supports the hydraulic stop sleeve 108 above the compression valve assembly 74.

Figure 5:
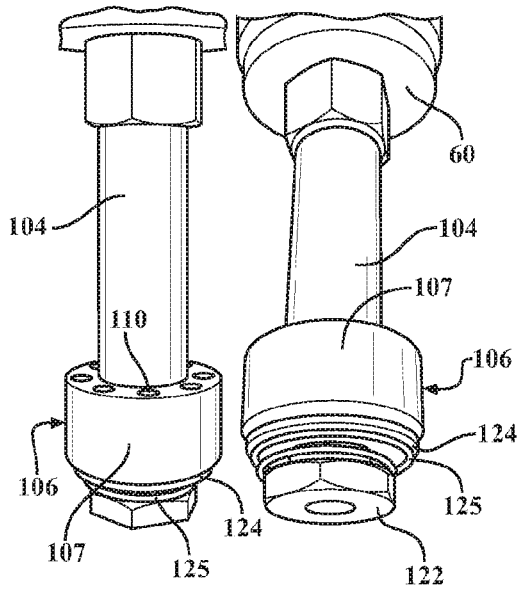
FIG. 5 is a partial, perspective top-down view and bottom-up view of a hydraulic stop piston shown in FIG. 4.

Referring now to FIG. 5, FIG. 5 is a partial, perspective top-down view and bottom-up view of the hydraulic stop piston 106 shown in FIG. 4. The hydraulic stop piston 106 of FIG. 5 includes at least one flow passage 110 extending through the hydraulic stop piston 106 to allow for fluid flow. Although the hydraulic stop piston 106 of FIG. 5 includes at least one flow passage 110, various embodiments of the hydraulic stop piston 106 of the secondary dampening assembly 80 of the subject disclosure do not include at least one flow passage 110 extending through the hydraulic stop piston 106 to allow for fluid flow. In this embodiment, the nut 122 is secured to the extender 104, and an intake disc 124 and an intake spring 125 are disposed between the nut 122 and the hydraulic stop piston 106. The intake disc 124 is adjacent to the hydraulic stop piston 106, and the intake spring 125 is disposed adjacent to the nut 122. The nut 122 acts as a stop for the intake spring 125. The nut 122 does not secure the hydraulic stop piston 106 to the extender 104.

Figure 6:
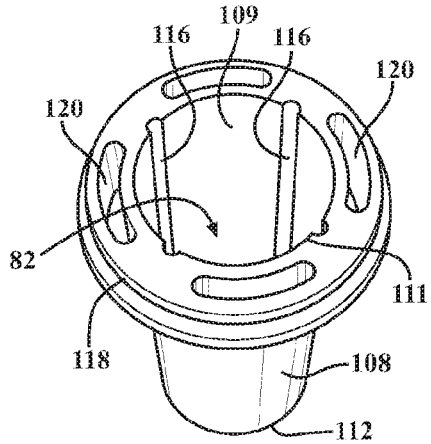
FIG. 6 is a top-down perspective view of a hydraulic stop sleeve shown in FIG. 4.

Referring now to FIG. 6, FIG. 6 is a top-down perspective view of the hydraulic stop sleeve 108 shown in FIG. 4. The hydraulic stop sleeve 108 of FIG. 6 has the open end 111 for receiving the hydraulic stop piston 106 and defines the non-tapered bore 82 shaped to receive the hydraulic stop piston 106. In this embodiment the bore 82 is not tapered, e.g. does not progressively narrow to provide increased fluidic resistance.

In the embodiment of FIG. 6, the hydraulic stop sleeve 108 has at least one flow groove 116 extending longitudinally along an inner surface 109 of the hydraulic stop sleeve 108. A flange 118 extends about the open end 111 for locating the hydraulic stop sleeve 108 within the pressure tube 56. The flange 118 has a plurality of slots 120 for allowing fluid to flow through.

Generally referring to the hydraulic stop piston 106 and the hydraulic stop sleeve 108 of the secondary dampening assembly 80 of the shock absorber 24 disclosed herein, the hydraulic stop sleeve 108 has a flow groove 116 extending longitudinally along the inner surface 109 of the hydraulic stop sleeve 108. In the embodiment of FIG. 4, the hydraulic stop sleeve 108 has the flow groove 116, more specifically, a plurality of the flow grooves 116, 4 to be exact, extending longitudinally along the inner surface 109 of the hydraulic stop sleeve 108, and the hydraulic stop piston 106 does not have the flow groove 116 extending longitudinally along the outer surface 107 of the hydraulic stop piston 106.

Regarding the flow groove 116, as is established above, at least one of the flow grooves 116 is included on the inner surface 109 of the hydraulic stop sleeve 108. Of course, a plurality of the flow grooves 116 can be included on the inner surface 109 of the hydraulic stop sleeve 108. In various embodiments, 1, 2, 3, 4, 5, 6, 7, 8, 9, 10, 11, 12, or more flow grooves 116 can be included on the inner surface 109 of the hydraulic stop sleeve 108. The plurality can be further defined as a range comprising any number of flow grooves 116 above, e.g. from 2 to 12 or from 2 to 6. The at least one flow groove 116 included on the hydraulic stop sleeve 108 can be part of a continuous number (e.g. a pattern) of flow grooves 116 formed on the inner surface 109 of the hydraulic stop sleeve 108.

In various embodiments, the hydraulic stop piston 106 may also have at least one flow groove 116 extending longitudinally along an outer surface 107 of the hydraulic stop piston 106. If one or more flow grooves 116 is included on the hydraulic stop piston 106, the flow groove(s) 116 can be distinguished from the flow passage 110 of the hydraulic stop piston 106 (if included) in that the flow groove 116 is cut into the outer surface 107 of the hydraulic stop piston 106 while the flow passage 110 extends through the hydraulic stop piston 106.

The flow groove 116 can define various geometries. For example, in some embodiments, the flow grooves 116 define a semi-circular geometry. In other embodiments, the flow grooves 116 define a triangular or even square geometry. If more than one flow groove 116 is included, the flow grooves 116 included can define the same geometry or the flow grooves 116 included can define different geometries. The flow groove 116 can be of various sizes, and if more than one flow groove 116 is included, the flow grooves 116 included can have the same size or the flow grooves 116 included can have different sizes. The geometry, the size, the location, and the number of flow grooves 116 included on the hydraulic stop sleeve 108 can be varied to change the amount of dampening provided by the secondary dampening assembly 80.

Figure 7:
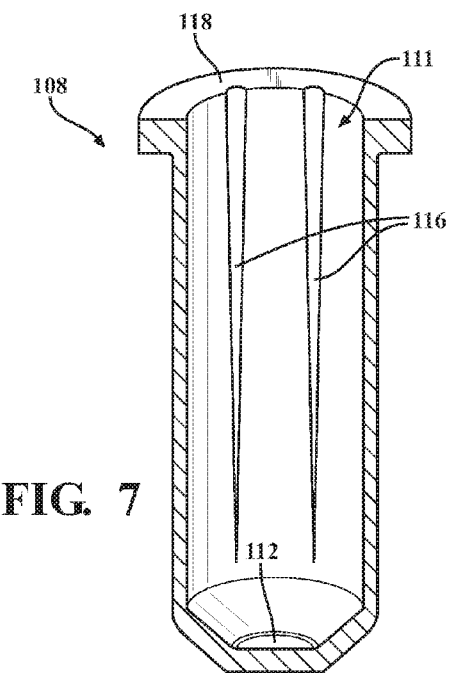
FIG. 7 is a perspective, cross-sectional view of an embodiment of the hydraulic stop sleeve.

In one embodiment, the flow grove 116 is tapered to increase resistance as the hydraulic stop piston 106 moves into the hydraulic stop sleeve 108. As an example, a hydraulic stop sleeve 108 having 2 tapered flow grooves 116 is shown in FIG. 7. In the embodiment of FIG. 7, the tapered flow grooves 116 do not extend longitudinally from the open end 111 towards the closed end 112 of the hydraulic stop sleeve 108 for a total length of the hydraulic stop sleeve 108. In many embodiments, the flow grooves 116 extend longitudinally from the open end 111 towards the closed end 112 of the hydraulic stop sleeve 108 a length of from about 70 to about 95, alternatively from about 85 to about 95, % of the total length of the hydraulic stop sleeve 108, but do not extend the total length of the hydraulic stop sleeve 108. In alternative embodiments, one or more of the flow grooves 116 extend longitudinally from the open end 111 towards the closed end 112 of the hydraulic stop sleeve 108 the total length of the hydraulic stop sleeve 108. In some embodiments, a plurality of flow grooves 116 are included on the hydraulic stop sleeve 108 and a combination of tapered and non-tapered flow grooves 116 are included. Non-tapered flow grooves 116 have a uniform geometry or profile to provide consistent resistance as the hydraulic stop piston 106 moves into the hydraulic stop sleeve 108.

Figure 8:
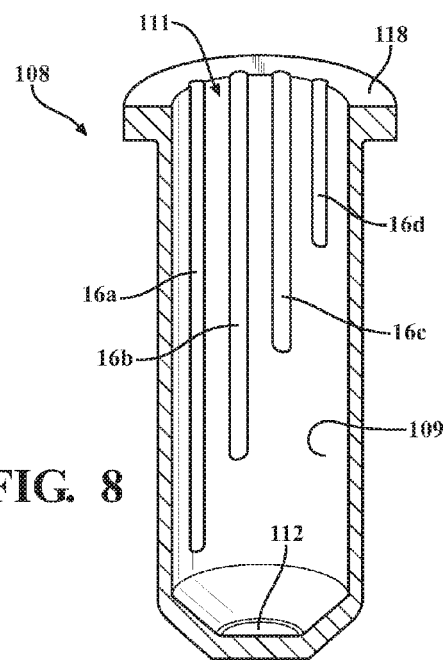
FIG. 8 is a perspective, cross-sectional view of another embodiment of the hydraulic stop sleeve.

In another embodiment, the hydraulic stop sleeve 108 can include a plurality of flow grooves 116 extending longitudinally and having different lengths along the inner surface 109 of the hydraulic stop sleeve 108. In this embodiment, the plurality of flow grooves 116 extending longitudinally and having different lengths can be tapered, non-tapered, or a combination thereof. For example, referring now to FIG. 8, in one non-limiting embodiment, the hydraulic stop sleeve 108 includes four flow grooves 116, a first flow groove 116a extending longitudinally from the open end 111 towards the closed end 112 of the hydraulic stop sleeve 108 and having a length of about 25% of the length of the inner surface 109 of the hydraulic stop sleeve 108, i.e., starting at the open end 111 of the hydraulic stop sleeve 108 and extending about one-quarter of the length of the inner surface 109 of the hydraulic stop sleeve 108, a second flow groove 116b extending longitudinally from the open end 111 towards the closed end 112 of the hydraulic stop sleeve 108 and having a length of about 45% of the length of the inner surface 109 of the hydraulic stop sleeve 108, a third flow groove 116c extending longitudinally from the open end 111 towards the closed end 112 of the hydraulic stop sleeve 108 and having a length of about 65% of the length of the inner surface 109 of the hydraulic stop sleeve 108, and a fourth flow groove 116d extending longitudinally from the open end 111 towards the closed end 112 of the hydraulic stop sleeve 108 and having a length of about 85% of the length of the inner surface 109 of the hydraulic stop sleeve 108. Of course, in various embodiments, different numbers of flow grooves 116 having different lengths can be included to obtain a certain resistance. In such an embodiment, the hydraulic stop sleeve 108 can have a plurality of flow grooves 116, all flow grooves 116 having different lengths (as is shown in FIG. 8). Alternatively, in such an embodiment, the hydraulic stop sleeve 108 can have a plurality of flow grooves 116, some of the flow grooves 116 having the same length and other flow grooves 116 having different lengths.

In another embodiment, the hydraulic stop sleeve 108 can include the plurality of flow grooves 116 extending longitudinally wherein the flow grooves 116 comprise a plurality of holes 117 which are drilled into the hydraulic stop sleeve 108. The holes 117 of such are drilled latitudinally into the hydraulic stop sleeve 108. When the hydraulic stop piston 106 enters the hydraulic stop sleeve 108, a fluid (e.g. oil) chamber 114 in the hydraulic stop sleeve 108 is closed, and all remaining fluid is forced out of the fluid chamber 114 via the flow grooves 116 in the hydraulic stop sleeve 108 which creates resistance, i.e., additional/secondary dampening. In such embodiments, flow grooves 116 comprising various arrangements of holes 117, drilled latitudinally into the hydraulic stop sleeve 108 can be utilized to achieve the dampening profile desired in the secondary dampening assembly 80.

Figure 9:
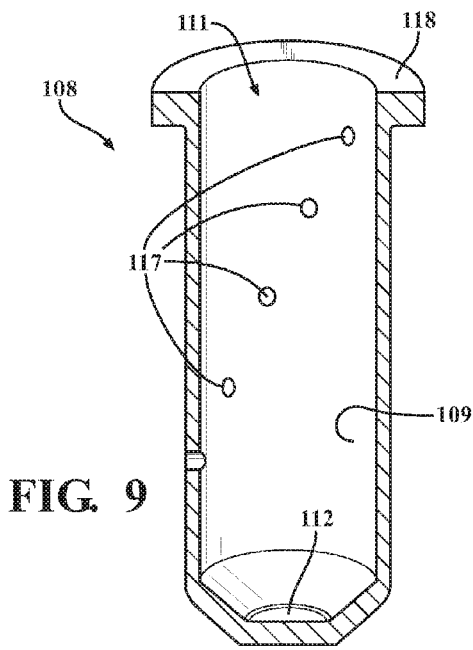
FIG. 9 is a perspective, cross-sectional view of yet another embodiment of the hydraulic stop sleeve.

In some embodiments, the hydraulic stop sleeve 108 includes the flow groove 116 comprising a linear plurality of holes 117. In yet another embodiment, the hydraulic stop sleeve 108 includes the flow groove 116 comprising a helical plurality of holes 117, as is shown in FIG. 9. The size and the number of holes 117 included in such embodiments can vary. In some embodiments, of from about 2 to about 10, alternatively from about 2 to about 6, holes 117 are included in the hydraulic stop sleeve 108. In FIG. 9, the holes 117 are drilled latitudinally into the hydraulic stop sleeve 108. In the embodiment of FIG. 9, the amount of holes does not have to decrease along the length to provide an increasing resistance. If there are 5 holes 117 distributed over the length of the hydraulic stop sleeve 108, as is shown in FIG. 9, when the hydraulic stop piston 106 enters the hydraulic stop sleeve 108, the 5 holes 117 are open, the further the hydraulic stop piston 106 travels into the hydraulic stop sleeve 108, the less open holes 117 will be left below the hydraulic stop piston 106. Thus, in the embodiment of FIG. 9, resistance increases as the hydraulic stop piston 106 travels into the hydraulic stop sleeve 108.

In another embodiment, an amount of holes 117 progressively decreases along the length of the hydraulic stop sleeve 108 so that resistance increases as the hydraulic stop piston 106 enters the hydraulic stop sleeve 108. Of course, the amount of holes 117 does not have to decrease along the length of the hydraulic stop sleeve 108 to provide increasing resistance.

Referring back to FIG. 4 and, in particular, the secondary dampening assembly 80 of FIG. 4, the hydraulic stop sleeve 108 has the closed end 112 and the open end 111. The flange 118 supports the hydraulic stop sleeve 108 above the compression valve assembly 74. As described previously, the gap 113 between the hydraulic stop piston 106 and the extender 104 allows for a small amount of radial/latitudinal movement (radial free play) to facilitate a smooth movement of the hydraulic stop piston 106 as it enters the hydraulic stop sleeve 108, moves in the hydraulic stop sleeve 108, and exits the hydraulic stop sleeve 108. The interior surface 109 at the open end of the hydraulic stop sleeve 108 can be beveled (not shown), or the flange 118 can have a chamfer (not shown) which can further facilitate a smooth entry of the hydraulic stop piston 106 into the hydraulic stop sleeve 108. When the hydraulic stop piston 106 enters the hydraulic stop sleeve 108, the fluid chamber 114 in the hydraulic stop sleeve 108 is closed and all remaining fluid needs to pass via the flow groove 116 in the hydraulic stop sleeve 108. The dampening generated by this is additional, and/or secondary, to the main dampening, causing more energy anticipation at compressed position. When the direction changes to rebound, the pressure below the hydraulic stop piston 106 causes the intake disc 124 to lift (into an open position) and the chamber below the hydraulic stop piston 106 is filled again with fluid. Without being limited thereto, in this way, the compression hydraulic stop generates sufficient extra energy anticipation in compression without any effect on rebound.

The hydraulic stop piston 106 of FIG. 5 includes at least one flow passage 110 extending through the hydraulic stop piston 106 to allow for fluid flow. Of course, although the hydraulic stop piston 106 of FIG. 5 includes at least one flow passage 110, various embodiments of the hydraulic stop piston 106 of the secondary dampening assembly 80 of the subject disclosure do not include at least one flow passage 110 extending through the hydraulic stop piston 106 to allow for fluid flow. In the embodiment of FIG. 5, the nut 122 is secured to the extender 104, and the intake disc 124 and an intake spring 125 are disposed between the nut 122 and the hydraulic stop piston 106.

Figure 10:
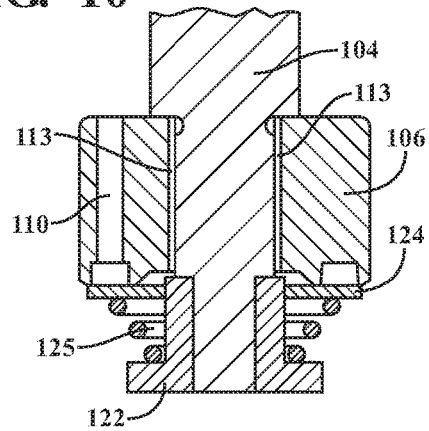
FIG. 10 is a cross-sectional view of an embodiment of the hydraulic stop piston having a flow passage.
Figure 11:
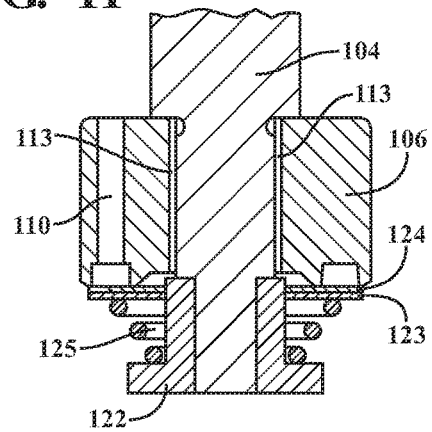
FIG. 11 is a cross-sectional view of another embodiment of the hydraulic stop piston having a flow passage.

As is alluded to above, the intake disc 124 of the hydraulic stop piston 106 of the secondary dampening assembly 80 of the shock absorber 24 disclosed herein is in a closed position when the hydraulic stop piston 106 moves into the hydraulic stop sleeve 108 and is in an open position when the hydraulic stop piston 106 moves out of the hydraulic stop sleeve 108. In one embodiment, when the intake disc 124 of the hydraulic stop piston 106 is in the closed position, the intake disc 124 fully covers the at least one flow passage 110 extending through the hydraulic stop piston 106; therefore, the fluid chamber 114 in the hydraulic stop sleeve 108 is fully closed, and fluid which is being compressed in the hydraulic stop sleeve 108 must flow out of the hydraulic stop sleeve 108 via the at least one flow groove 116. Said differently, in such an embodiment, the intake disc 124 is pressed onto a bottom surface of the hydraulic stop piston 106 when the hydraulic stop piston 106 is moving into the hydraulic stop sleeve 108 (i.e., the intake disc 124 is in a closed position) and, thus, fluid is prevented from flowing through the at least one flow passage 110 of the hydraulic stop piston 106 and the fluid must flow through the at least one flow groove 116 to relieve the hydraulic pressure in the hydraulic stop sleeve 108 which causes a dampening effect. Referring now to FIG. 10, an enlarged cross-sectional view of the hydraulic stop piston 106 of FIGS. 4 and 5 is shown. In FIG. 10, the nut 122 is secured to the extender 104 and an intake disc 124 and an intake spring 125 are disposed between the nut 122 and the hydraulic stop piston 106. The intake disc 124 is adjacent to hydraulic stop piston 106 and the intake spring 125 is disposed adjacent to the nut 122. As such, in the embodiment of FIG. 10, the intake disc 124 is pressed onto a bottom surface of the hydraulic stop piston 106 when the hydraulic stop piston 106 is moving into the hydraulic stop sleeve 108 (i.e., the intake disc 124 is in a closed position) and fluid is prevented from flowing through the at least one flow passage 110 of the hydraulic stop piston 106.

In an alternative embodiment, when the intake disc 124 of the hydraulic stop piston 106 is in the closed position, the intake disc 124 partially covers the at least one flow passage 110 extending through the hydraulic stop piston 106; therefore, the fluid chamber 114 in the hydraulic stop sleeve 108 is partially closed, and fluid which is being compressed in the hydraulic stop sleeve 108 must flow out of the hydraulic stop sleeve 108 via both the partially covered at least one flow passage 110 and the at least one flow groove 116. Said differently, the intake disc 124 is pressed onto a bottom surface of the hydraulic stop piston 106 when the hydraulic stop piston 106 is moving into the hydraulic stop sleeve 108 (i.e., the intake disc 124 is in a closed position) and, thus, fluid is restricted (but not prevented) from flowing through the at least one flow passage 110 of the hydraulic stop piston 106 and the fluid must flow through both the partially covered at least one flow passage 110 and the at least one flow groove 116 to relieve the hydraulic pressure in the hydraulic stop sleeve 108 which causes a dampening effect. Referring now to FIG. 10, an enlarged cross-sectional view of an embodiment of the hydraulic stop piston 106 is shown. In FIG. 10, the nut 122 is secured to the extender 104 and an orifice disc 123 (a plain disc with a notch on its outer diameter), an intake disc 124 and an intake spring 125 are disposed between the nut 122 and the hydraulic stop piston 106. The orifice disc 123 is adjacent to the hydraulic stop piston 106 (i.e., is located between the intake disc 124 and the hydraulic stop piston 106), the intake disc 124 is adjacent to the intake spring 125, which is adjacent to the nut 122. As such, in the embodiment of FIG. 10, the orifice disc 123 is pressed onto a bottom surface of the hydraulic stop piston 106 when the hydraulic stop piston 106 is moving into the hydraulic stop sleeve 108 (i.e., the intake disc 124 is in a closed position) and fluid is restricted (but not prevented) from flowing through the at least one flow passage 110 of the hydraulic stop piston 106.

For purposes of the subject disclosure "fully covers the at least one flow passage 110" means that the intake disc 124 covers about 100% of the at least one flow passage 110 in the hydraulic stop piston 106 and, thus, completely limits the flow of fluid through the at least one flow passage 110 when the hydraulic stop piston 106 is moving into the hydraulic stop sleeve 108. Further, "partially covers the at least one flow passage 110" means that the intake disc 124 covers greater than about 90% of the at least one flow passage 110, alternatively greater than about 80% of the at least one flow passage 110, alternatively greater than about 70% of the at least one flow passage 110, alternatively greater than about 60% of the at least one flow passage 110, alternatively greater than about 50% of the at least one flow passage 110, alternatively greater than about 10% of the at least one flow passage 110, in the hydraulic stop piston 106 and, thus, partially limits the flow of fluid through the at least one flow passage 110 when the hydraulic stop piston 106 is moving into the hydraulic stop sleeve 108. Of course, when the movement/direction of the hydraulic stop piston 106 changes, i.e., the hydraulic stop piston 106 rebounds, the pressure below the hydraulic stop piston 106 causes the intake disc 124 to lift, the flow of fluid through the at least one flow passage 110 is not restricted, and the chamber below the hydraulic stop piston 106 is filled again with fluid.

Figure 12:
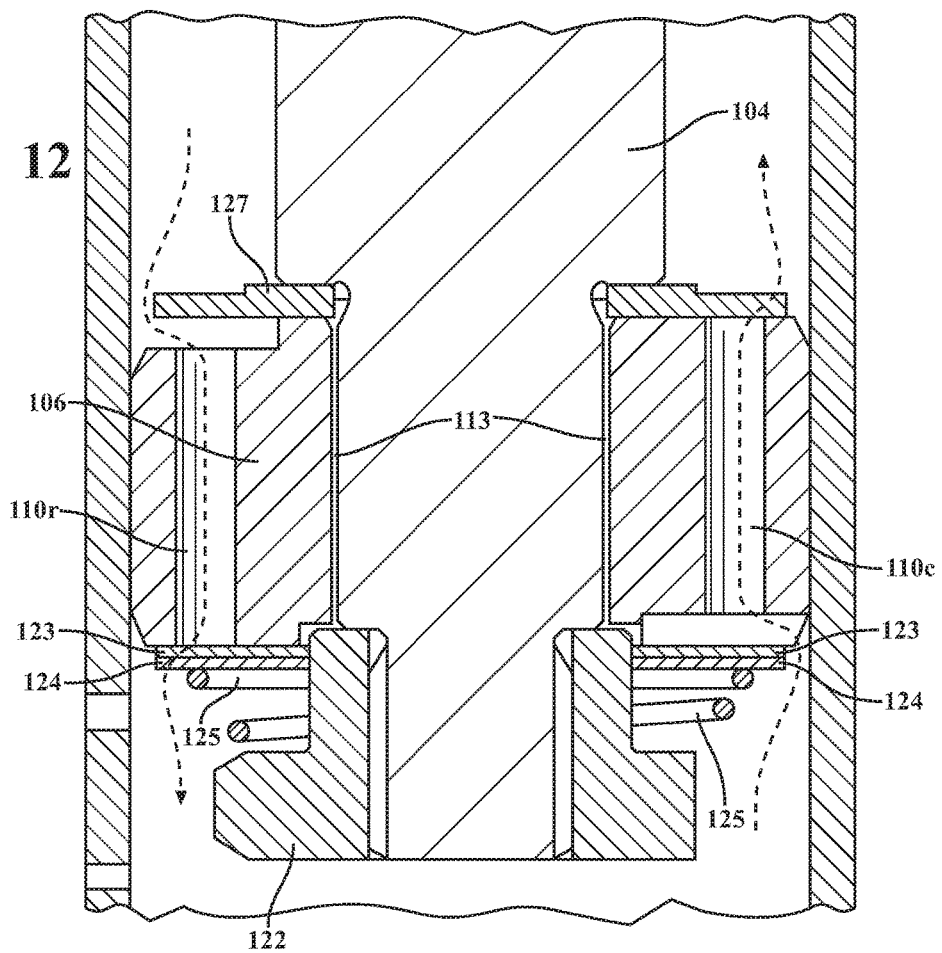
FIG. 12 is a cross-sectional view of another embodiment of the hydraulic stop piston having a first and a second flow passage.

Referring now to FIG. 12, an enlarged cross-sectional view of an embodiment of the hydraulic stop piston 106 is shown. In FIG. 12, the nut 122 is secured to the extender 104, and intake disc 124 and an intake spring 125 are disposed between the nut 122 and the hydraulic stop piston 106. Further, a disc stack 127 is adjacent to the hydraulic stop piston 106 (opposite to the intake disc 124). In FIG. 12, two flow passages are shown: 1) a first flow passage 110r which creates a rebound path for the fluid when the hydraulic stop piston 106 is moving out of the hydraulic stop sleeve 108, i.e., upon rebound; and 2) a second flow passage 110c which creates a compression flow path for the fluid when the hydraulic stop piston 106 is moving into the hydraulic stop sleeve 108, i.e., upon compression. The disc stack 127 can be tuned to create a "blow off" characteristic at a specified pressure. More specifically, the disc stack 127 can be tuned by adjusting the landing area and the thicknesses of the discs. In this embodiment, the intake disc 124 and the intake spring 125 function as described above. The first flow passage 110r functions as previously described herein allowing fluid to flow into the hydraulic stop sleeve as the 108 hydraulic stop piston 106 is moving out of the hydraulic stop sleeve 108. As such, in the embodiment of FIG. 12, the orifice disc 123 is pressed onto a bottom surface of the hydraulic stop piston 106 when the hydraulic stop piston 106 is moving into the hydraulic stop sleeve 108 (i.e., the intake disc 124 is in a closed position) and fluid is prevented (as shown) from flowing through the first flow passage 110r of the hydraulic stop piston 106 and the second flow passage 110c is open allowing the flow of fluid out of the hydraulic stop sleeve 108. However, the second flow passage 110c is only active when the pressure in the hydraulic stop sleeve 108 below the hydraulic stop piston 106 exceeds a certain pressure level. When the certain pressure level is exceeded (as the hydraulic stop piston 106 is moving into the hydraulic stop sleeve 108), the disc stack 127 will lift and fluid will flow through the second flow passage 110c. In most embodiments, the second flow passage 110c works in conjunction with flow groves 116 that are tapered.

Figure 13:
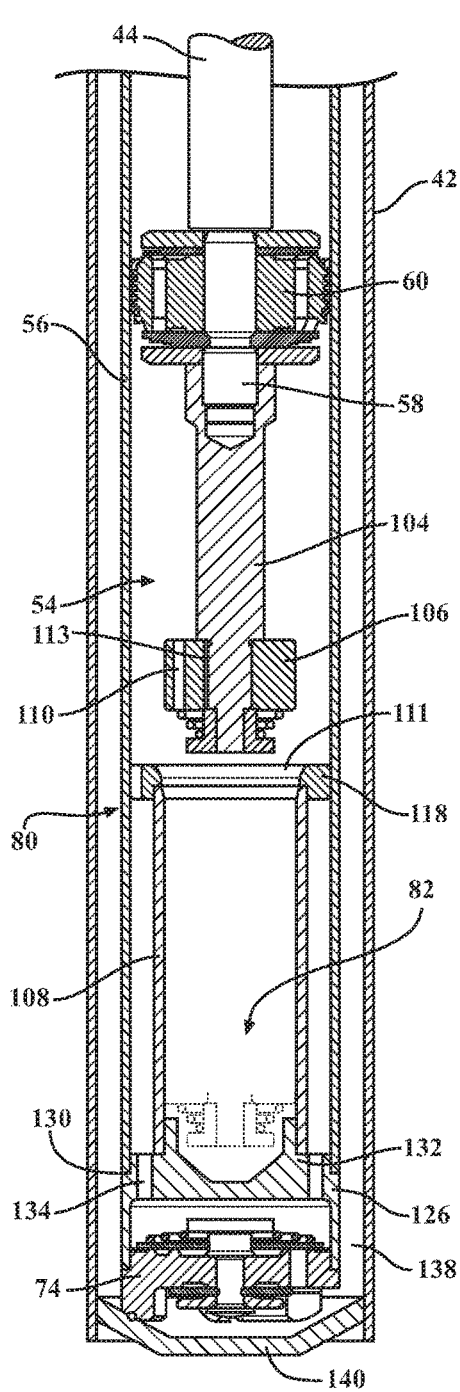
FIG. 13 is a partial, cross-sectional view of a shock absorber according to another embodiment of the subject invention.
Figure 14:
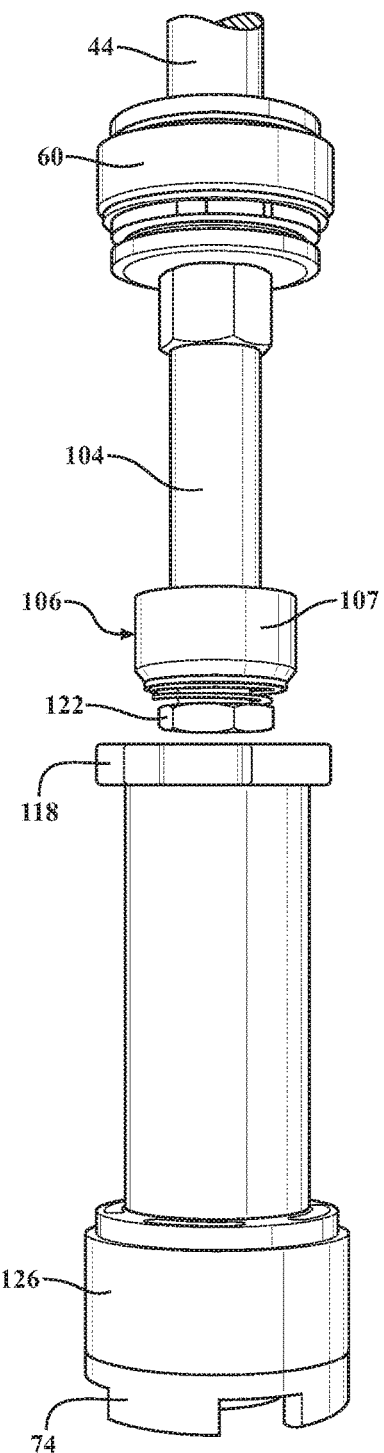
FIG. 14 is a side-view of a hydraulic stop piston and hydraulic stop sleeve shown in FIG. 13.

In another embodiment, the secondary dampening assembly 80 of the subject invention is shown in FIGS. 13 and 14, wherein the hydraulic stop sleeve 108 includes a terminal cup 126 sealing the closed end 112 of the hydraulic stop sleeve 108. The terminal cup 126 supports the sleeve adjacent to the compression valve assembly 74. The terminal cup 126 has a first sealing surface 130 for sealing the hydraulic stop sleeve 108 and a second sealing surface 132 for sealing the pressure tube 56. The terminal cup 126 further defines terminal flow passages 134 for allowing fluid to flow therethrough.

Figure 15:
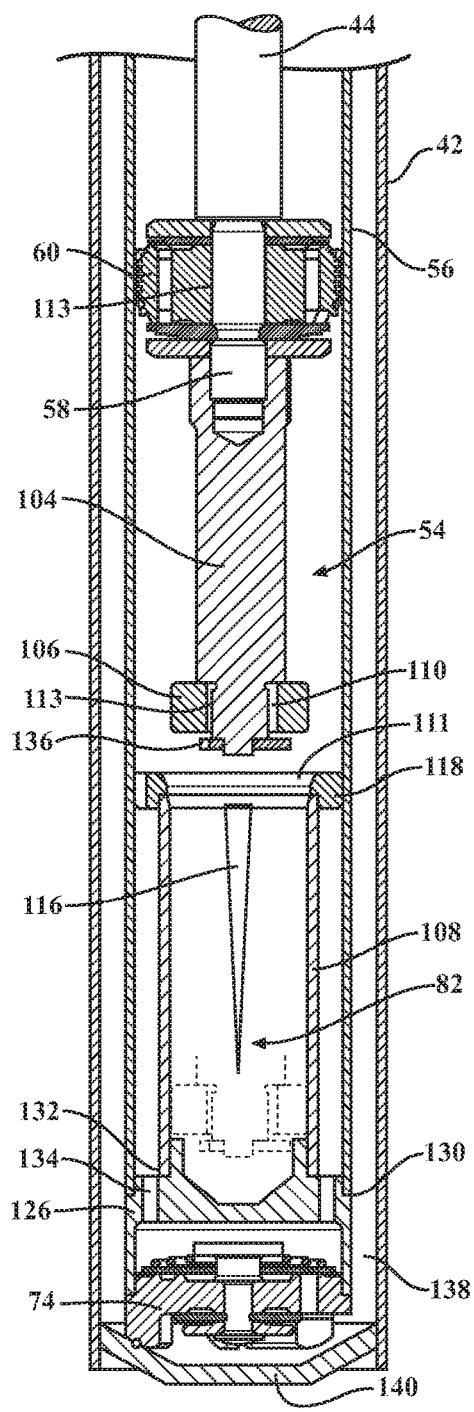
FIG. 15 is a partial, cross-sectional view of a shock absorber according to yet another embodiment of the subject invention.
Figure 16:
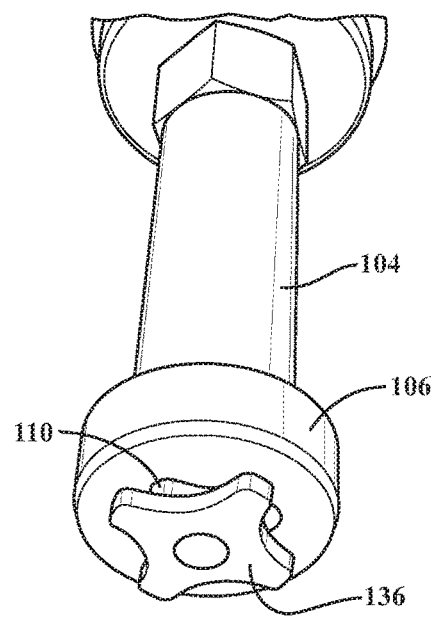
FIG. 16 is a bottom-up, side perspective view of the hydraulic stop piston shown in FIG. 15.

In yet another embodiment, the secondary dampening assembly 80 of the subject invention is shown in FIGS. 15 and 16. Specifically, the hydraulic stop piston 106 is secured to the extender 104 with a locking disc 136 and the hydraulic stop piston 106 does not have any flow passages 110. Instead, the hydraulic stop piston 106 has a cross-shaped inner diameter (flow passage 110) which is defined by four flow grooves 116 and the locking disc 136 has a similarly corresponding cross-shape. The hydraulic stop piston 106 can slide, which enables fluid to flow during the rebound stroke. More specifically, hydraulic stop piston 106 can move axially on the extender 104, so that it works as a check valve.

Figure 17:
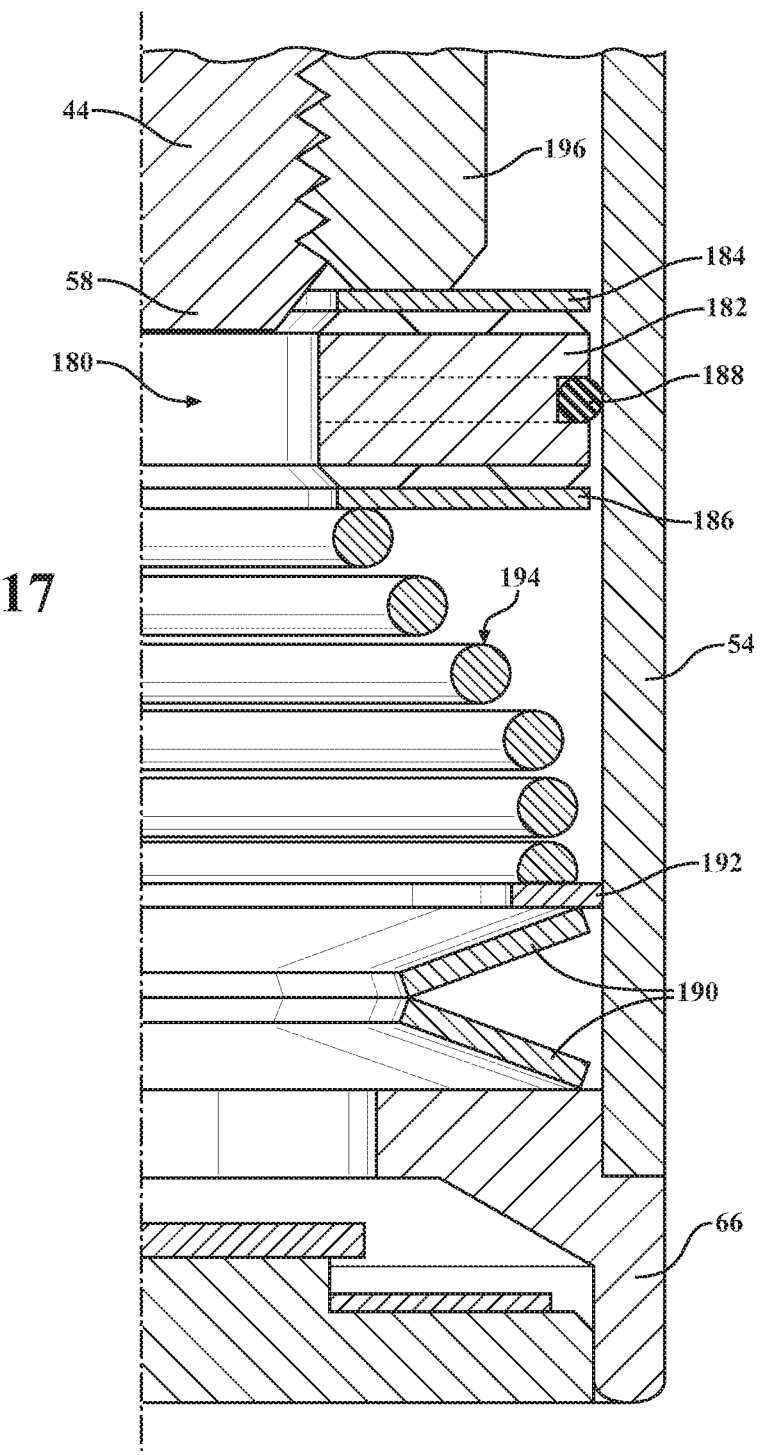
FIG. 17 is a partial, cross-sectional view of a secondary dampening assembly according to a further embodiment of the subject invention.

Referring to FIG. 17, another embodiment of the secondary dampening assembly 180 is shown. The secondary dampening assembly 180 includes an orifice plug 182 disposed within the lower working chamber. The orifice plug 182 has an upper flow disc 184 and a lower flow disc 186 adjacent the orifice plug 182. A sealing ring 188 is disposed in the orifice plug 182 to engage the inner pressure assembly 54. A pair of Belleville washers 190, or discs springs, are located adjacent a bridge 66 with a frusto-conical shape opening away from one another. A flat washer 192 is disposed above the Belleville washer 190 nearest the orifice plug 182. A variable rate spring 194 is disposed between the lower flow disc 186 and the flat washer 192.

In operation, during the compression stroke, a piston nut 196, secured to the second end 58 (shown threaded) of the rod 44, contacts the upper flow disc 184. This contact forces the orifice plug 182 to slide against the pressure of the variable rate spring 194. Further dampening occurs as the variable rate spring 194 becomes solid, the compression stroke continues and the force causes the Belleville washers 190 to deflect until solid, or flattened out. During the rebound stroke, the Belleville washers 190 return to the original shape and the variable rate spring 194 forces the orifice plug 182 to its original location.

Figure 18:
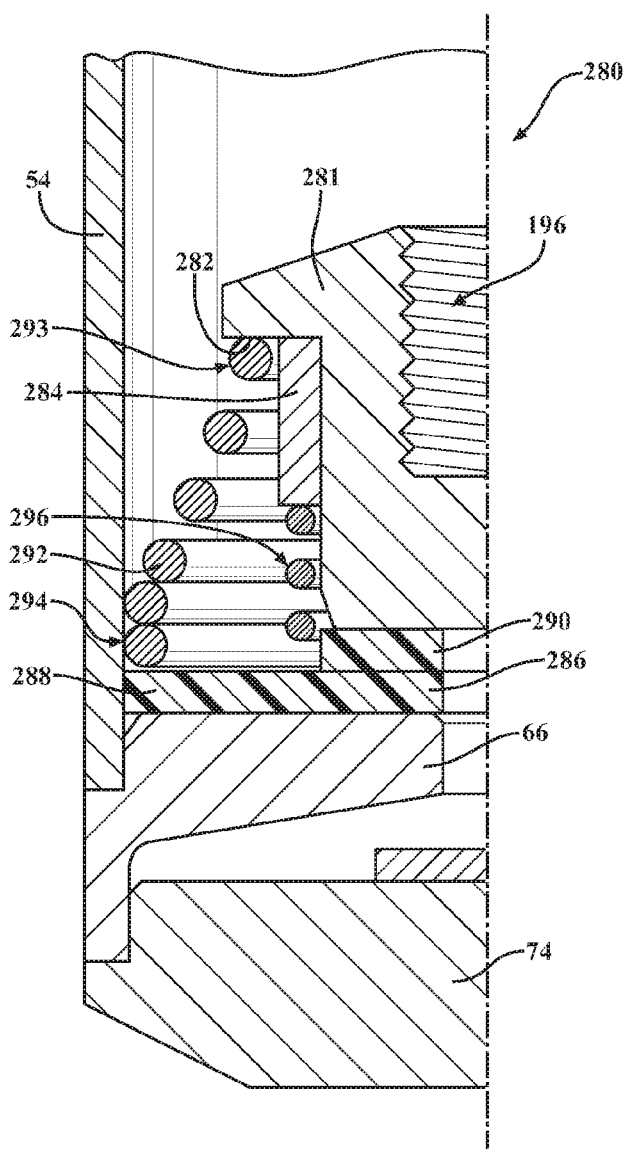
FIG. 18 is a partial, cross-sectional view of a secondary dampening assembly to yet a further embodiment of the subject invention.

Referring to FIG. 18, yet another embodiment of the secondary dampening assembly 280 is shown. The secondary dampening assembly 280 includes the piston nut 196 secured to the second end 58 of the rod 44 and the piston nut 196 includes a support washer 281 extending therefrom. The support washer 281 has a diameter less than the width of the inner pressure assembly 54 and has a first contact area 282 extending about the support washer 281. The support washer 281 has a downwardly extending portion 284 that has a diameter less than the diameter of the support washer 281. A compressible stop 286 is disposed adjacent the bridge 66 extending between the sides of the inner pressure assembly 54 and has a first height 288 and a second height 290 less than the first height 288. The first height 288 is closest to the sides of the inner pressure assembly 54 and the second height 290 is nearer the center of the inner pressure assembly 54. The compressible stop 286 can be any compressible material, such as urethane or foam material.

A first spring 292 has a narrow end 293 and a wide end 294 contacting the first height 288 of the compressible stop 286. The wide end 294 has an outer diameter the same as the inner diameter of the inner pressure assembly 54 such that the first spring 292 is press-fit into the inner pressure assembly 54 while the wide end 294 rests against the compressible stop 286. The narrow end 293 has a diameter that is less than the diameter of the support washer 281, but greater than the diameter of the portion 284.

A second spring 296 is located adjacent to the second height 290 of the compressible stop 286 such that the second spring 296 is press-fit against the step between the first and second heights 288, 290. The second spring 296 has a diameter that will contact the downwardly extending portion 284.

During a compression stroke, the support washer 281 contacts the narrow end 293 of the first spring 292 providing a first dampening characteristic. As the compression stroke continues, the downwardly extending portion 284 contacts the second spring 296 providing a second dampening characteristic. Once the first and second springs 292, 296 are near solid, the compressible stop 286 may absorb any contact with the piston nut 196 at the second height 290.

Figure 19:
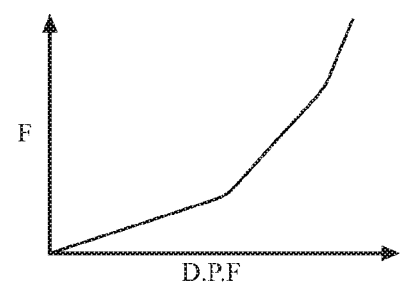
FIG. 19 is a graph of force versus deflection characteristics according to the embodiment shown in FIG. 18.

The secondary dampening assembly 280 provides three stages of dampening, whereas traditional jounce bumpers are specifically designed to provide only one force versus deflection characteristic per bumper. Since many different performance characteristics are needed during vehicle dynamic testing, multiple jounce bumpers would be needed. The secondary dampening assembly 280 provides multiple different performance characteristics with the same assembly and by simply changing the characteristics of the first and second springs 292, 296. Further, the secondary dampening assembly 280 provides for three unique dampening characteristics. The first dampening is caused by the first spring 292, the second dampening by the second spring 296, and the third dampening by the compressible stop 286. FIG. 19 shows a graph generally of the three stages of force versus deflection characteristics according to this embodiment of the subject invention.

Figure 20:
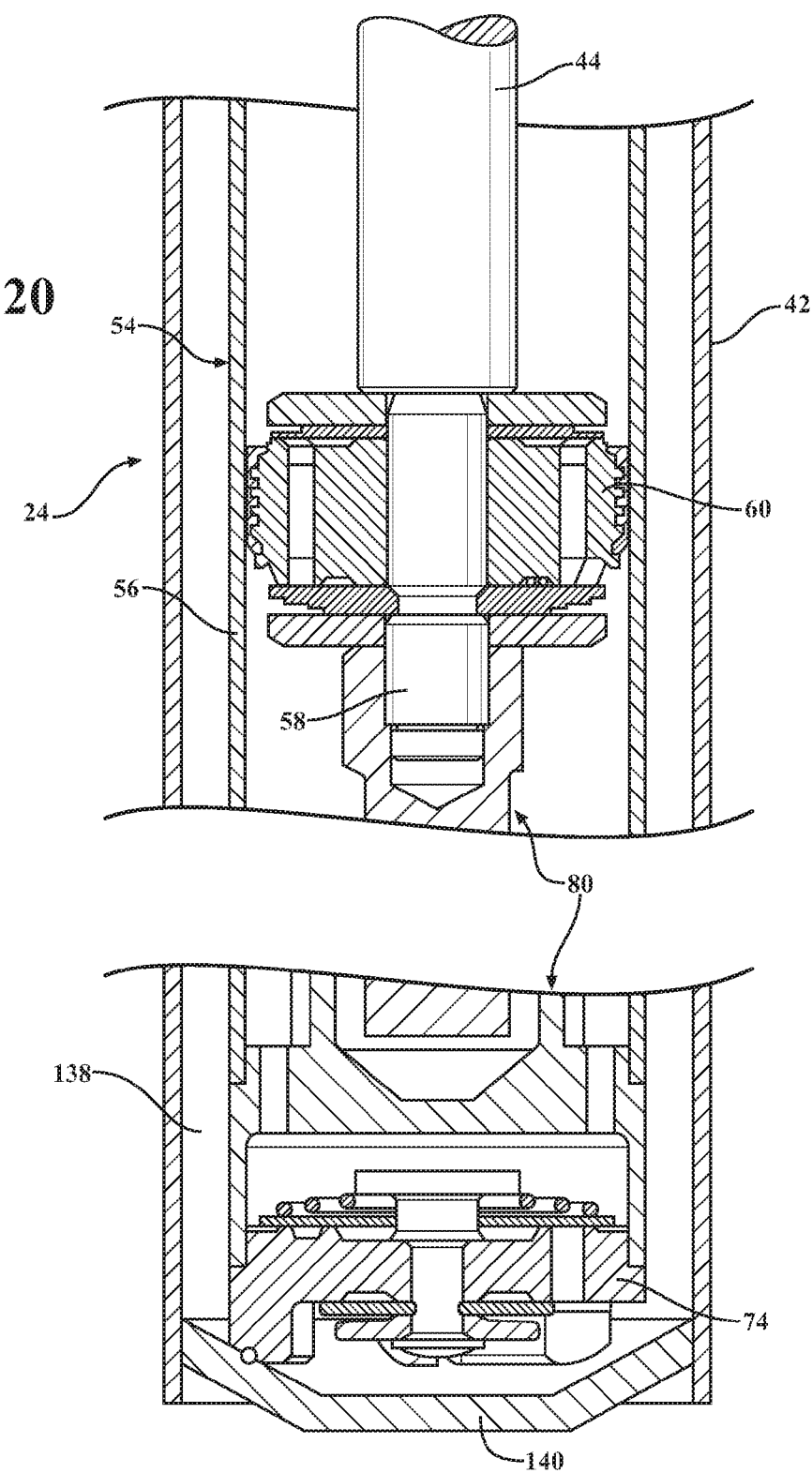
FIG. 20 is a partial, cross-sectional view of a shock absorber according to another embodiment of the subject invention.

Referring to FIG. 20, a partial, cross-sectional view of the shock absorber 24 according to one embodiment of the subject invention is shown. The shock absorber 24 has a secondary dampening assembly that is shown generally at 80. The shock absorber 24 of the present invention includes the inner pressure assembly 54 and the base assembly 42. The inner pressure assembly 54 and base assembly 42 cooperate, as described in greater detail below, to define a "double tube" shock absorber 24. The base assembly 42 may be further described as an outer cylinder, wherein the base assembly 42 defines a chamber 138 for at least partially accommodating the inner pressure assembly 54 therein and the chamber 138 terminates at the floor 140. The inner pressure assembly 54 includes the pressure tube 56, the rod guide 72, the compression valve assembly 74, the piston assembly 60, and the rod 44 discussed above.

Figure 21:
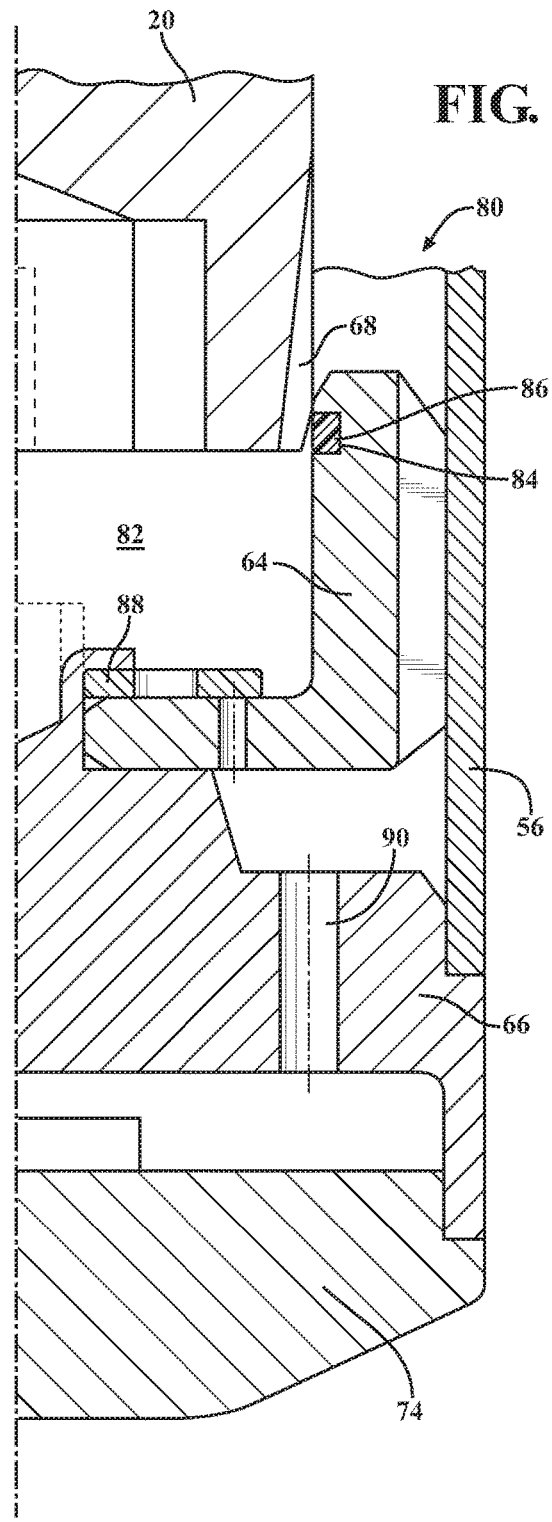
FIG. 21 is a partial, cross-sectional view of a shock absorber comprising a lockout piston and a lockout collar according to one embodiment of the subject invention.

Referring to FIG. 21, the secondary dampening assembly 80, according to one embodiment of the subject invention, includes a lockout piston 62 coupled to the second end 58 of the rod 44, a lockout collar 64, and the bridge 66. The lockout piston 62 is preferably attached to the second end 58 of the rod 44 and replaces the nut securing the piston assembly 60 thereto. The bridge 66 is coupled to the lockout collar 64 and engages the pressure tube 56 and compression valve assembly 74. In other words, the lockout collar 64 seals the pressure tube 56. The bridge 66 includes fluid passages 90 for allowing fluid flow.

Figure 22:
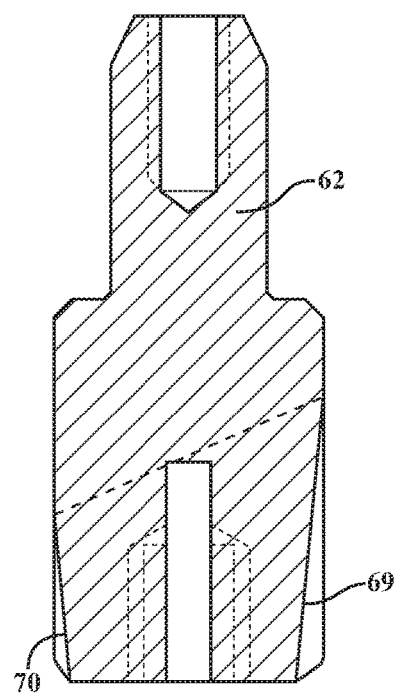
FIG. 22 is a close-up, side-view of the lockout piston shown in FIG. 21.

The lockout piston 62 has a diameter less than a diameter of the pressure tube 56 and may be formed with any type of metal, such as steel, or could be a plated metal. The lockout piston 62 includes at least one flow groove 68 extending longitudinally along a side of the lockout piston 62. As best shown in FIG. 22, a close-up, side-view of the lockout piston 62 of FIG. 21 is shown. The lockout piston 62 preferably includes a plurality of flow grooves 68 disposed radially about the lockout piston 62. A first flow groove 69 having a first height and a first width and a second flow groove 70 having a second height and a second width. The width and height of the first and second flow grooves 69, 70 may be the same or different depending upon the particular application, as will be described in more detail below. Further, there may be one to four tapered flow grooves 68 and each groove's width, taper, or length may vary.

Figure 24:
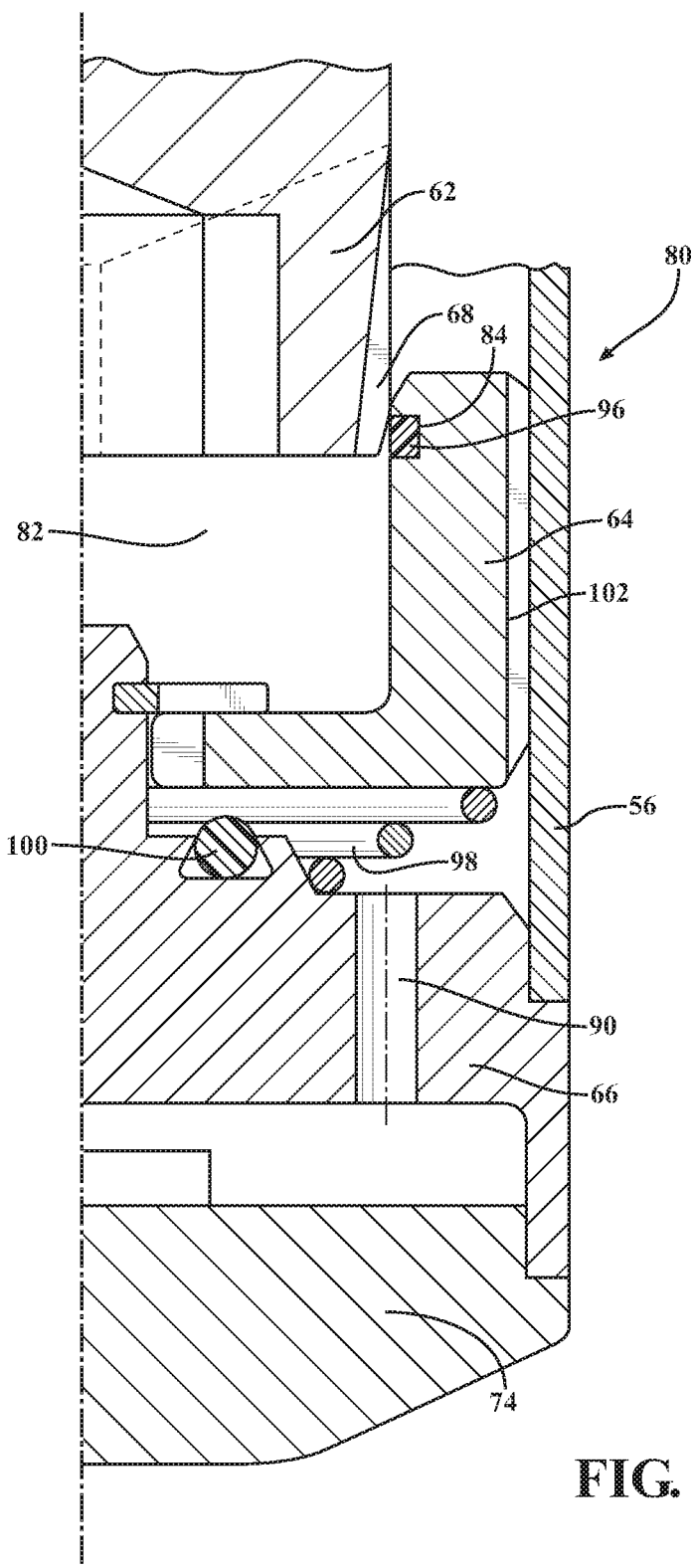
FIG. 24 is a partial, cross-sectional view of a shock absorber according to another embodiment of the subject invention.

With reference back to FIG. 21, the lockout collar 64 is disposed within the pressure tube 56 and the lockout collar 64 has the bore 82 shaped to receive the lockout piston 62. The lockout collar 64 may be made of a powdered metal and may have a plurality of ducts 102 disposed about the outer surface of the lockout collar 64. For example, the outer surface may have from eight to ten ducts 102 depending upon the particular application. The plurality of ducts 102 is shown in FIG. 24. The bore 82 defines a sealing channel 84 and at least one seal 86 is disposed in the sealing channel 84 to engage the lockout piston 62 when the lockout piston 62 is disposed in the bore 82. A check valve disc 88 is adjacent the lockout collar 64 for allowing fluid to flow through the lockout collar 64 as understood by those of ordinary skill in the art. In other words, the check valve disc 88 allows fluid to enter the lockout collar 64 during a rebound stroke. The lockout collar 64 has an outer diameter co-extensive with the inner diameter of the pressure tube 56.

Figure 23:
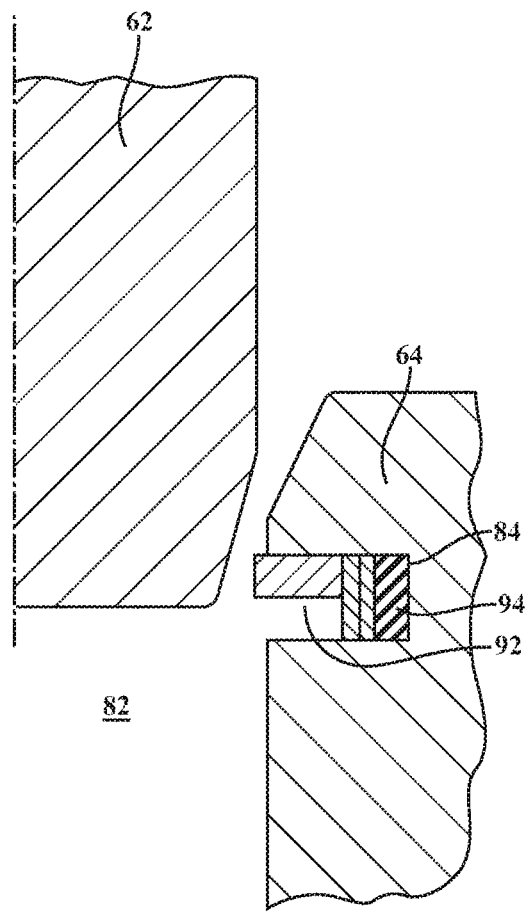
FIG. 23 is a partial, cross-sectional view of the lockout piston and lockout collar.

Referring to FIG. 23, the sealing channel 84 receives the seal 86. Specifically, one embodiment of the seal 86 includes a first metal seal 92 and a second non-metal seal 94 disposed in the sealing channel 84. The non-metal seal 94 may be formed of an elastomeric material to bias the metal seal 92 into engagement with the lockout piston 62. The alignment of the lockout piston 62 and the lockout collar 64 is important to ensure proper sealing therebetween. It is not uncommon for the second end 58 of the rod 44 to be slightly angled or tilted. The seal 86 compensates for any misalignment. The non-metal seal 94 assists in compensating for misalignment.

Figure 25:
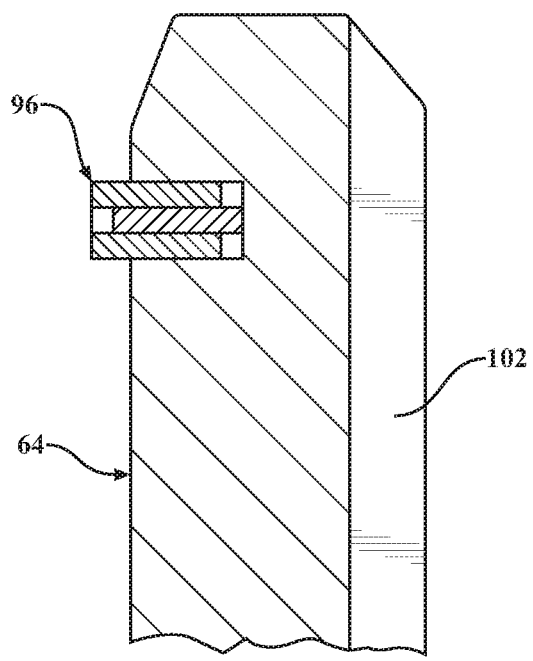
FIG. 25 is a close-up, side-view of another embodiment of the lockout collar shown in FIG. 24.

Another embodiment of the secondary dampening assembly 80 is shown in FIG. 24. The lockout collar 64 has an outer diameter less than the inner diameter of the pressure tube 56. A radially compensating seal ring 96 disposed in the sealing channel 84 to maintain the lockout piston 62 within the lockout collar 64. In order to maintain the position of the lockout collar 64, a spring 98 is disposed between the lockout collar 64 and the bridge 66. A bridge seal 100 is disposed between the bridge 66 and the lockout collar 64 to seal fluid flow through the bridge 66 and the compression valve assembly 74. The locking disc 136 secures the lockout collar 64 relative to the compression valve assembly 74 in a longitudinal direction. FIG. 25 is a close-up, side-view of another embodiment of the lockout collar shown in FIG. 24.

The operation of the secondary dampening assembly 80 shown in FIGS. 15-19 will be discussed generally with reference to both embodiments shown therein. The lockout piston 62 fits into the lockout collar 64 such that there is an increase in compression dampening forces occurring at the end of the compression stroke of the shock absorber 24. Before the lockout piston 62 enters the bore 82 of the lockout collar 64, the bore 82 is full of fluid. Toward the end of the compression stroke, the lockout piston 62 enters the lockout collar 64 and engages either the seal 86 or the seal ring 96. As the lockout piston 62 travels downward, fluid in lockout collar 64 flows up through the flow groove 68. Due to the taper of the flow groove 68, the amount of fluid forced up and out of the lockout collar 64 is being forced through a smaller tapered area. The fluid restriction increases and the compression lockout force increases. During a rebound stroke, as the lockout piston 62 travels upward, the pressure differential causes the check valve disc 88 to open and allows fluid to flow.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A shock absorber assembly comprising:
   a pressure tube extending between an upper end and a lower end;
   a rod guide disposed adjacent said upper end of said pressure tube;
   a compression valve assembly disposed adjacent to said lower end of said pressure tube;
   a piston assembly disposed in said pressure tube between said rod guide and said compression valve assembly;
   a rod operatively attached to said piston assembly and having a first end supported by said rod guide so as to concentrically align said rod with said pressure tube, and a second end disposed within said pressure tube;
   an extender coupled to said second end of said rod;
   a hydraulic stop piston having a diameter less than a diameter of said pressure tube, said hydraulic stop piston carried by said extender with a gap defined radially between said hydraulic stop piston and said extender to allow radial movement;
   a hydraulic stop sleeve disposed within said pressure tube such that said hydraulic stop sleeve engages said pressure tube, said hydraulic stop sleeve having an open end for receiving said hydraulic stop piston and a closed end and defining a non-tapered bore shaped to receive said hydraulic stop piston; and
   wherein said hydraulic stop sleeve has a flow groove extending longitudinally along an inner surface of said hydraulic stop sleeve.

2. An assembly as set forth in claim 1 including a plurality of said flow grooves.

3. An assembly as set forth in claim 2 wherein said plurality of flow grooves extend longitudinally along said inner surface of said hydraulic stop sleeve from an open end towards a closed end of said hydraulic stop sleeve and have at least two different lengths.

4. An assembly as set forth in claim 3 wherein the plurality of flow grooves are further defined as tapered, non-tapered, or a combination thereof.

5. An assembly as set forth in claim 2 wherein said plurality is further defined as from 2 to 6.

6. An assembly as set forth in claim 2 wherein the plurality of flow grooves are further defined as tapered, non-tapered, or a combination thereof.

7. An assembly as set forth in claim 1 wherein said hydraulic stop piston includes at least one flow passage extending through said hydraulic stop piston.

8. An assembly as set forth in claim 7 wherein said hydraulic stop piston is secured to said extender with a nut, and an intake disc and an intake spring are disposed between said nut and said hydraulic stop piston.

9. An assembly as set forth in claim 8 wherein said intake disc partially covers said at least one flow passage extending through said hydraulic stop piston when said intake disc is in a closed position.

10. An assembly as set forth in claim 9 further comprising an orifice disc between said hydraulic stop piston and said intake disc.

11. An assembly as set forth in claim 8 wherein said intake disc fully covers said at least one flow passage extending through said hydraulic stop piston when said intake disc is in a closed position.

12. An assembly as set forth in claim 1 wherein said hydraulic stop sleeve includes a flange extending about said open end for locating said hydraulic stop sleeve within said pressure tube.

13. An assembly as set forth in claim 12 wherein said flange has a plurality of slots for allowing fluid to flow through.

14. An assembly as set forth in claim 13 wherein said flange supports said hydraulic stop sleeve spaced above said compression valve assembly.

15. An assembly as set forth in claim 1 wherein said closed end further comprises a terminal cup sealing said hydraulic stop sleeve and supporting said sleeve adjacent to said compression valve assembly.

16. An assembly as set forth in claim 15 wherein said terminal cup is further defined as having a first sealing surface for sealing said hydraulic stop sleeve and a second sealing surface for sealing said pressure tube.

17. An assembly as set forth in claim 15 wherein said terminal cup further defines flow passages for allowing fluid to flow therethrough.

18. An assembly as set forth in claim 1 wherein said hydraulic stop piston includes a first and a second flow passage.

19. An assembly as set forth in claim 18 wherein said first flow passage provides a rebound path for a fluid when said hydraulic stop piston is moving out of said hydraulic stop sleeve and said second flow passage provides a compression flow path for said fluid when said hydraulic stop piston is moving into said hydraulic stop sleeve.

20. An assembly as set forth in claim 1 wherein said gap has a thickness of from about 0.5 to about 0.01 mm.

* * * * *